(12) United States Patent
Bower et al.

(10) Patent No.: US 10,752,523 B2
(45) Date of Patent: Aug. 25, 2020

(54) SYSTEMS AND METHODS FOR RECOVERY OF PURIFIED WATER AND CONCENTRATED BRINE

(71) Applicant: Paragon Space Development Corporation, Tucson, AZ (US)

(72) Inventors: Chad E. Bower, Littleton, CO (US); Barry Wynns Finger, Santa Fe, TX (US)

(73) Assignee: Paragon Space Development Corporation, Tucson, AZ (US)

( * ) Notice: Subject to any disclaimer, the term of this patent is extended or adjusted under 35 U.S.C. 154(b) by 35 days.

(21) Appl. No.: 15/704,889

(22) Filed: Sep. 14, 2017

(65) Prior Publication Data
US 2018/0079662 A1    Mar. 22, 2018

Related U.S. Application Data

(60) Provisional application No. 62/396,011, filed on Sep. 16, 2016.

(51) Int. Cl.
*C02F 1/44* (2006.01)
*B01D 61/36* (2006.01)
(Continued)

(52) U.S. Cl.
CPC .............. *C02F 1/447* (2013.01); *B01D 3/145* (2013.01); *B01D 5/006* (2013.01); *B01D 5/0072* (2013.01);
(Continued)

(58) Field of Classification Search
CPC ........ B01D 2311/04; B01D 2311/2673; B01D 2311/13; B01D 3/145; B01D 3/346;
(Continued)

(56) References Cited

U.S. PATENT DOCUMENTS 3,415,719 A    12/1968 Telkes
3,547,271 A    12/1970 Edwards
(Continued)

FOREIGN PATENT DOCUMENTS

AU     2012233249 A1    10/2013
WO     WO00/22684 A2    4/2000
(Continued)

OTHER PUBLICATIONS

Integrated Industrial Wastewater Reuse by Heat Recovery, Energy Research and Development Division Final Project Report, 59 Pages, Mar. 2015. (Year: 2015).*

(Continued)

*Primary Examiner* — Pranav N Patel
(74) *Attorney, Agent, or Firm* — Weaver Austin Villeneuve & Sampson LLP

(57) ABSTRACT

This disclosure provides water processing apparatuses, systems, and methods for recovering purified water and concentrated brine from wastewater. The water processing apparatuses, systems, and methods utilize ionomer membrane technology to separate water vapor from volatiles of a wastewater stream. The wastewater stream is evaporated into a gas stream including water vapor and volatiles of the wastewater stream in an evaporation container. The gas stream is delivered to a water separation module spatially separated from and fluidly coupled to the evaporation container. The water vapor of the gas stream is separated out in the water separation module while the volatiles are rejected. The water vapor can be collected into purified water while concentrated brine from the wastewater stream is left behind in the evaporation container.

11 Claims, 10 Drawing Sheets

(51) Int. Cl.

| | | |
|---|---|---|
| B01D 71/36 | (2006.01) | |
| B01D 5/00 | (2006.01) | |
| B01D 3/14 | (2006.01) | |
| C02F 1/04 | (2006.01) | |
| C02F 101/10 | (2006.01) | |
| C02F 101/30 | (2006.01) | |
| C02F 101/32 | (2006.01) | |
| C02F 103/10 | (2006.01) | |

(52) U.S. Cl.
CPC ......... *B01D 61/364* (2013.01); *B01D 61/366* (2013.01); *B01D 71/36* (2013.01); *C02F 1/048* (2013.01); *B01D 2311/04* (2013.01); *B01D 2311/13* (2013.01); *B01D 2311/2673* (2013.01); *B01D 2313/38* (2013.01); *B01D 2313/50* (2013.01); *C02F 2101/10* (2013.01); *C02F 2101/301* (2013.01); *C02F 2101/32* (2013.01); *C02F 2101/322* (2013.01); *C02F 2103/10* (2013.01)

(58) Field of Classification Search
CPC .... B01D 5/006; B01D 5/0072; B01D 61/364; B01D 61/366; B01D 71/36; B01D 2313/38; B01D 2313/50; C02F 1/048; C02F 1/447; C02F 2201/301; C02F 2201/322; C02F 2201/10; C02F 2201/32; C02F 2103/10

See application file for complete search history.

(56) References Cited

U.S. PATENT DOCUMENTS

| | | | |
|---|---|---|---|
| 3,612,282 A | 10/1971 | Cheng | |
| 4,373,462 A | 2/1983 | Fish | |
| 4,568,441 A | 2/1986 | Covitch et al. | |
| 5,028,298 A * | 7/1991 | Baba | B01D 1/305 159/31 |
| 5,232,085 A | 8/1993 | Hayashi et al. | |
| 5,547,551 A | 8/1996 | Bahar et al. | |
| 7,510,752 B1 | 3/2009 | Robertson | |
| 9,399,195 B2 | 7/2016 | MacCallum et al. | |
| 9,511,327 B2 | 12/2016 | MacCallum et al. | |
| 9,695,066 B2 | 7/2017 | MacCallum et al. | |
| 2005/0164025 A1 | 7/2005 | Simonetti et al. | |
| 2006/0081455 A1 | 4/2006 | Yonover | |
| 2008/0182149 A1 | 7/2008 | Zhang et al. | |
| 2008/0296215 A1 * | 12/2008 | Simon | C02F 9/00 210/202 |
| 2009/0057128 A1 | 3/2009 | Vane et al. | |
| 2009/0181276 A1 | 7/2009 | Beutel et al. | |
| 2009/0266048 A1 | 10/2009 | Schwarz | |
| 2010/0028635 A1 | 2/2010 | Bansal et al. | |
| 2010/0096317 A1 | 4/2010 | Morita | |
| 2012/0137727 A1 | 6/2012 | Huang et al. | |
| 2012/0152840 A1 | 6/2012 | Fujita et al. | |
| 2012/0255897 A1 | 10/2012 | Lu et al. | |
| 2012/0292176 A1 * | 11/2012 | Machhammmer | B01D 1/14 203/10 |
| 2013/0075333 A1 | 3/2013 | Pruet et al. | |
| 2013/0081537 A1 | 4/2013 | Bikson et al. | |
| 2014/0263061 A1 * | 9/2014 | Taylor | C02F 1/447 210/640 |
| 2015/0217232 A1 | 8/2015 | MacCallum et al. | |
| 2016/0304364 A1 | 10/2016 | MacCallum et al. | |
| 2017/0113950 A1 | 4/2017 | Bahar et al. | |
| 2018/0079662 A1 | 3/2018 | Bower et al. | |
| 2018/0370816 A1 | 12/2018 | Bower et al. | |
| 2019/0263699 A1 | 8/2019 | Finger et al. | |

FOREIGN PATENT DOCUMENTS

| | | |
|---|---|---|
| WO | WO2009/005897 | 1/2009 |
| WO | WO2015/116959 | 8/2015 |
| WO | WO2018/053151 | 3/2018 |

OTHER PUBLICATIONS

Office Action issued in U.S. Appl. No. 14/609,735, dated Jul. 8, 2015.

Notice of Allowance issued in U.S. Appl. No. 14/609,735, dated Dec. 7, 2015.

Notice of Allowance issued in U.S. Appl. No. 14/609,735, dated Apr. 1, 2016.

Notice of Allowance issued in U.S. Appl. No. 15/194,391, dated Aug. 3, 2016.

Office Action issued in U.S. Appl. No. 15/343,150, dated Dec. 29, 2016.

Notice of Allowance issued in U.S. Appl. No. 15/343,150, dated Apr. 14, 2017.

International Search Report and Written Opinion issued in Application No. PCT/US15/13829, dated May 8, 2015.

International Preliminary Report on Patentability issued in Application No. PCT/US15/13829, dated Mar. 5, 2016.

International Search Report and Written Opinion issued in Application No. PCT/US17/51598, dated Dec. 7, 2017.

Kelsey, et al., "Development of Ionomer-membrane Water Processor (IWP) Technology for Water Recovery from Urine," 44th International Conference on Environmental Systems, Tucson, AZ, Jul. 13-17, 2014, pp. 1-23.

Kelsey, et al., "Inspiration Mars ETDU Water Management System Test Results," 44th International Conference on Environmental Systems, Tucson, AZ, Jul. 13-17, 2014, pp. 1-28.

Kelsey, et al., Contaminant Robust Water Extraction from Lunar and Martian Soil for In Situ Resource Utilization—System Testing, American Institute of Aeronautics and Astronautics, pp. 1-15.

Kelsey, et al., Purifying Water Mined from Asteroids for In Situ Resource Utilization, Paragon: Space Development Corporation, pp. 1-23.

Kelsey, et al., "Employing Ionomer-Based Membrane pair technology to extract water from brine," 42nd International Conference on Environmental Systems, Tucson, AZ, Jul. 15-19, 2012, pp. 1-20.

Kelsey, et al., "Contaminant Robust Water Extraction from Lunar and Martian Soil for In Situ Resource Utilization—System Architecture Development," 42nd International Conference on Environmental Systems, Tucson, AZ, Jul. 15-19, 2012, pp. 1-14.

U.S. Miscellaneous Communication issued in U.S. Appl. No. 15/194,391, dated Aug. 22, 2016.

Office Action issued in U.S. Appl. No. 16/118,325, dated Jun. 20, 2019.

International Preliminary Report on Patentability issued in Application No. PCT/US2017/051598, dated Mar. 28, 2019.

Kelsey, et al. "Development of Ionomer-membrane Water Processor (IWP) technology for water recovery from urine," 44th International Conference on Environmental Systems, Jul. 13-17, 2014, pp. 1-23.

Final Office Action issued in U.S. Appl. No. 16/118,325, dated Dec. 3, 2019.

U.S. Appl. No. 16/808,147, filed Mar. 3, 2020, Bower et al.

* cited by examiner

SYSTEMS AND METHODS FOR RECOVERY OF PURIFIED WATER AND CONCENTRATED BRINE

PRIORITY CLAIM

This application claims the benefit of priority to U.S. Provisional Patent Application No. 62/396,011, filed Sep. 16, 2016 and entitled "SYSTEMS AND METHODS FOR RECOVERY OF PURIFIED WATER AND CONCENTRATED BRINE," which is hereby incorporated by reference in its entirety and for all purposes.

STATEMENT REGARDING FEDERALLY SPONSORED RESEARCH OR DEVELOPMENT

Some embodiments of this invention were made with United States Government Support under Contract Nos. 80NSSC18C0191 and NNX16CJ18P awarded by the National Aeronautics and Space Administration (NASA). The U.S. Government has certain rights in this invention.

TECHNICAL FIELD

This disclosure relates to systems, apparatuses, and methods of recovery of purified water and concentrated brine from wastewater, and more particularly to systems and methods of using a selective membrane distillation process to extract and collect purified water and concentrated brine from wastewater.

BACKGROUND

Many industries generate wastewater that is not usable or practical for drinking, agriculture, commercial use, and disposal. The wastewater may contain a high concentration of brine, contaminants, or other chemicals. For example, hydraulic fracturing utilizes pressurized liquid to break up rock formation beneath the ground surface to allow natural gas, petroleum, and brine to flow more freely. The pressurized liquid combines water with chemical additives, where the chemical additives assist in creating pressure to propagate fractures and carry proppant into the fractures. Possible chemical additives can include silica, quartz sand, hydrochloric acid, polyacrylamide, isopropanol, guar gum, hydroxyethyl cellulose, sodium carbonate, potassium carbonate, ammonium persulfate, citric acid, borate salts, N,N-dimethyl formamide, and glutaraldehyde. The pressurized liquid may also pick up naturally occurring substances during hydraulic fracturing, such as sodium chloride, natural gas (e.g., methane, ethane), carbon dioxide, and organic compounds including volatile organic compounds. Wastewater is formed after hydraulic fracturing that contains water along with a variety of chemical additives, volatile organic compounds, salts, and more. Such wastewater cannot be reused for hydraulic fracturing again. More generally, disposal of wastewater in industries such as hydraulic fracturing may be impractical, costly, and undesirable. Furthermore, recycling wastewater into usable water, environmentally safe water, or drinkable water can be costly, inefficient, and difficult.

Water recovery from wastewater may be important in terrestrial and space applications. Terrestrial applications where water recovery may be important may include water recycling in arid regions, water treatment for disaster relief, greywater recycling onboard ships, wastewater recycling from hydraulic fracturing, wastewater recycling from agricultural, animal, and food production operations, and water recycling at long-term military outposts, ships, and submarines. Space applications where water recovery may be important may include water reclamation to generate usable or potable water in long-term space missions. For example, wastewater in long-term space missions can consist of hygiene water, laundry water, humidity condensate, brines, and human waste (e.g., urine). Due to the high cost of delivering supplies to space, recovery of usable or potable water from wastewater may be critical to life support of crew members. Long duration space missions to the moon, Mars, and near-Earth asteroids may be mass-constrained and may require robust and reliable life support hardware. Closing the water loop on long duration space missions can be crucial to reducing mission mass, cost, and logistics support for orbiting facilities and planetary spacecraft.

SUMMARY

The systems, methods and devices of this disclosure each have several innovative aspects, no single one of which is solely responsible for the desirable attributes disclosed herein.

One innovative aspect of the subject matter described in this disclosure can be implemented in a system for treating wastewater. The system includes an evaporation container configured to receive wastewater and a heat source thermally coupled to the evaporation container, where the heat source is configured to heat the wastewater to produce a gas stream comprising water vapor and volatiles of the wastewater. The system further includes a water separation module spatially separated from and fluidly coupled to the evaporation container via gas or vapor transport, where the water separation module is configured to separate the water vapor from the volatiles. The system further includes a condenser module spatially separated from and fluidly coupled to the water separation module, where the condenser module is configured to receive the water vapor.

In some implementations, the water separation module includes an ionomer membrane configured to be permeable to the water vapor but substantially impermeable to the volatiles. In some implementations, the ionomer membrane has a first surface configured to receive and contact the gas stream from the evaporation container and a second surface opposite the first surface, where the water vapor partial pressure at the second surface is less than the water vapor partial pressure at the first surface. In some implementations, the system further includes a heat pump between the water separation module and the condenser module, where the heat pump is configured to produce a lower pressure at the second surface of the ionomer membrane relative to the first surface, and a greater pressure in the condenser module relative to the water separation module. In some implementations, the system further includes a carrier gas source configured to flow carrier gas through the evaporation container to carry the gas stream from the evaporation container to the water separation module, and a purge gas source configured to flow purge gas through the water separation module to carry the water vapor from the water separation module to the condenser module. In some implementations, the system further includes a regenerative heat exchanger thermally coupled with the condenser module and the evaporation container, where the regenerative heat exchanger is configured to cycle heat from the condenser module to the evaporation container. In some implementations, the evaporation container is configured to isolate the concentrated brine during transport, storage, and disposal of the concentrated brine.

Another innovative aspect of the subject matter described in this disclosure can be implemented in a method of recovering purified water and concentrated brine from wastewater. The method includes receiving a wastewater stream in an evaporation container, evaporating the wastewater stream in the evaporation container to produce a concentrated brine retained in the evaporation container and to produce a gas stream comprising water vapor and volatiles of the wastewater stream flowing towards a water separation module, and selectively separating the water vapor from the volatiles at the water separation module, where the water separation module is spatially separated from and fluidly coupled with the evaporation container via gas or vapor transport. The method further includes condensing the water vapor to purified water in a condenser module, where the condenser module is spatially separated from and fluidly coupled to the water separation module.

In some implementations, selectively separating the water vapor includes selectively permeating the water vapor through an ionomer membrane of the water separation module. In some implementations, the ionomer membrane has a first surface configured to receive and contact the gas stream from the evaporation container and a second surface opposite the first surface, where the water vapor partial pressure at the second surface is less than the water vapor partial pressure at the first surface. In some implementations, the volatiles are retained at the first surface of the ionomer membrane and the water vapor is passed to the second surface of the ionomer membrane. In some implementations, the method further includes flowing a carrier gas from the evaporation container to the water separation module, and flowing a purge gas from the water separation module to the condenser module. In some implementations, the method further includes increasing a pressure in the condenser module relative to the water separation module using a heat pump. In some implementations, the method further includes reducing a temperature in the condenser module relative to the water separation module using a regenerative heat exchanger, where the regenerative heat exchanger is configured to cycle heat from the condenser module to the evaporation container.

BRIEF DESCRIPTION OF THE DRAWINGS

Like reference numbers and designations in the various drawings indicate like elements.

DETAILED DESCRIPTION

Introduction

Recovery of water from wastewater for either safe disposal or reuse may offer significant advantages in space and terrestrial applications. Conventional purification processes may not be sufficient and practical for treating wastewater into usable or potable water. Fractional distillation techniques boil a mixture so that one or more fractions of the mixture will vaporize, thereby retaining a liquid. A temperature gradient is formed along a fractionating column so that some of the vapors condense and re-vaporize. This process may separate some of the volatile organic compounds from water, but many volatile organic compounds may remain with the water so that secondary processing is required. Osmotic distillation processes may remove ions, molecules, and larger particles from wastewater, but are not effective in limiting various volatile organic compounds. As a result, secondary processing to further remove volatile organic compounds may be required. Other distillation processes, such as steam distillation and vapor compression distillation (VCD), are not entirely effective in separating volatile organic compounds from water and may be more expensive, complex, and inefficient.

Purification of wastewater for local use (e.g., agriculture) or for potable purposes can result in a positive rate of return. There are also significant costs associated with the collection and disposal of brine contained in wastewater. Not only can purification of wastewater produce useful products like purified water, but can also produce concentrated brine that can be sold or reused in various industries.

Recovery of Purified Water and Concentrated Brine

The present disclosure can eliminate the cost associated with disposal of wastewater and generate clean water that can be disposed of directly to the environment, sold, or reused. Furthermore, the present disclosure can generate concentrated brine that can be sold or reused in various industries. The concentrated brine and the clean water can be self-contained. After the clean water is generated by the process described in the present disclosure, the concentrated brine from the wastewater need not be further pumped, treated, or processed. Instead, the concentrated brine is retained in a container or storage unit, where the container receives the wastewater and evaporates the wastewater into volatiles and water vapor. A selective membrane, such as an ionomer membrane, separates the water vapor from the volatiles by selectively permeating the water vapor while rejecting the volatiles. Selective permeation of the water vapor can be driven by a water vapor partial pressure differential across the ionomer membrane. In some implementations, an ionic fluid or other water separation technique may separate the water vapor from the volatiles.

Figure 1:
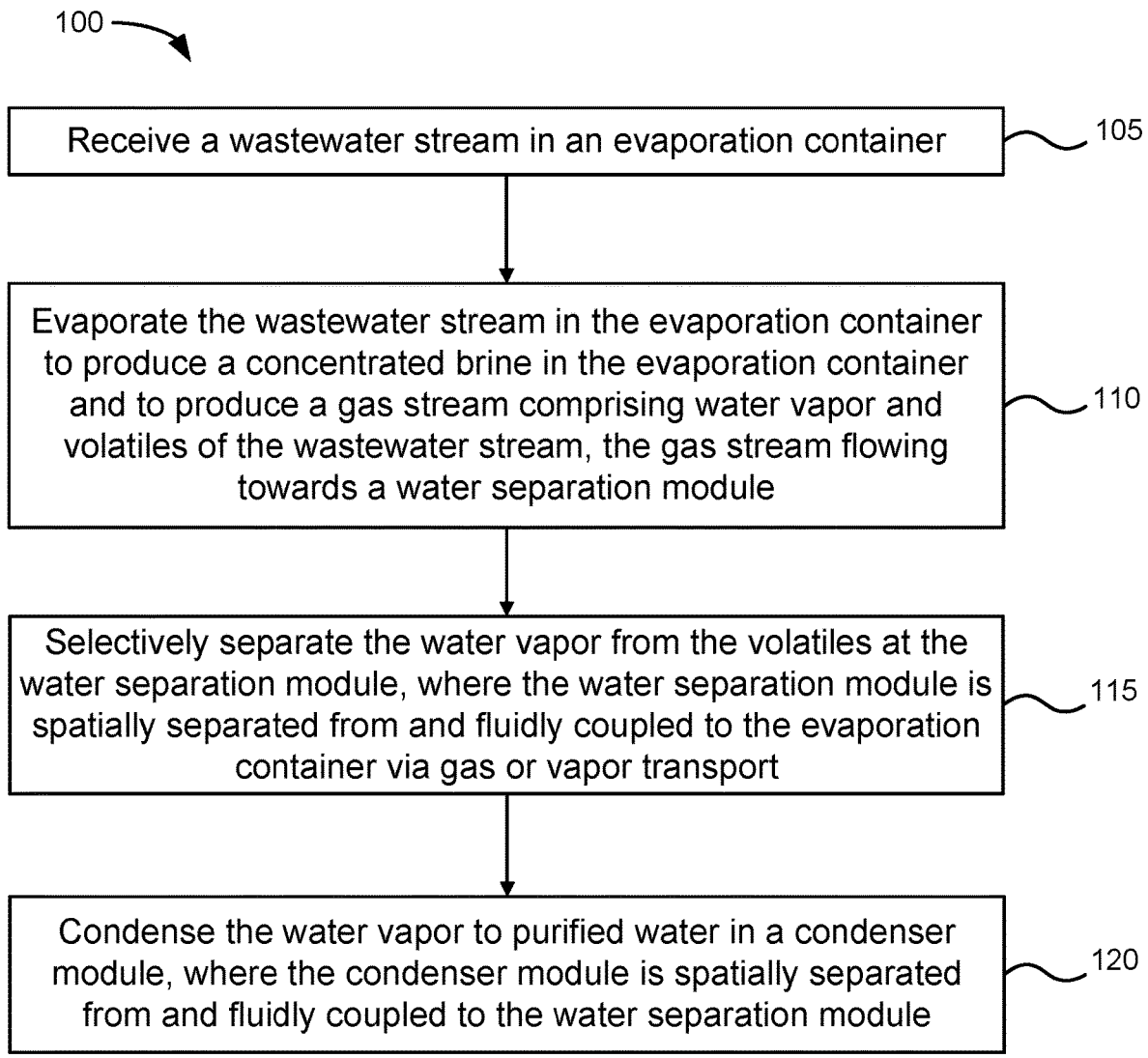
FIG. 1 shows a flow diagram of an example method of recovering purified water and concentrated brine from wastewater.

FIG. 1 shows a flow diagram of an example method of recovering purified water and concentrated brine from wastewater. The operations in a process 100 of FIG. 1 may be performed in different orders and/or with different, fewer, or additional operations. In some implementations, the operations in the process 100 may be performed by the system shown in FIG. 2, 3A-3D, or 4-6.

At block 105 of the process 100, a wastewater stream is received in an evaporation container. In addition to water, wastewater can include various contaminants, inorganic salts, and organic compounds, at least some of which are volatile. Many of the organic compounds are volatile organic compounds (VOCs). Volatile inorganic compounds such as ammonia can also be present in the wastewater. In some implementations, the wastewater can come from fluid used in hydraulic fracturing. The fluid used in hydraulic fracturing includes several chemical additives and can pick up a considerable amount of VOCs from hydraulic fracturing. At least some of the VOCs come from naturally occurring substances released from the underground formation that are allowed to flow back to the ground surface. In some implementations, the wastewater can come from human wastewater such as urine. Urine can include several different inorganic salts, urea, organic ammonium salts, free ammonia, and other organic compounds.

The wastewater may be introduced as a wastewater stream into the evaporation container. The evaporation container is an enclosed space for holding the wastewater stream. The evaporation container may serve as a storage unit, vessel, or tank for storing wastewater and retaining a concentrated brine from the wastewater stream. The evaporation container may be capable of receiving the wastewater stream and evaporating the wastewater stream into gases. The evaporation container may be spatially separated from and fluidly coupled with other modules, such as a water separation module and a condenser module. For example, the evaporation container may be fluidly coupled via gas or vapor transport with the other modules. In some implementations, the evaporation container may be part of a transportable vessel.

In some implementations, the process 100 may further include treating the wastewater stream in a pretreatment module (e.g. biological pretreatment) to stabilize the wastewater stream prior to receiving the wastewater stream in the evaporation container. The pretreatment module may be designed to treat the wastewater stream in the liquid phase. In some implementations, the pretreatment module may serve to remove surfactants that may not be otherwise removed in a conventional distillation process. In some implementations, the wastewater stream may be pretreated in the pretreatment module to prevent bacterial and mold growth as well as to remove dissolved organic carbon, anions, and ammonia. It will be understood that while the pretreatment module may use biological pretreatment to stabilize the wastewater stream, the pretreatment module is not limited to only biological pretreatment methods.

At block 110 of the process 100, the wastewater stream is evaporated in the evaporation container to produce a concentrated brine in the evaporation container and to produce a gas stream comprising water vapor and volatiles of the wastewater stream, the gas stream flowing towards a water separation module. A concentrated brine may be retained in the evaporation container as a result of the evaporation operation of block 110. In some implementations, the concentrated brine may include various inorganic and/or organic salts that did not convert into a vapor phase as a result of the evaporation operation. The inorganic and/or organic salts of the concentrated brine may present valuable commodities that can be reused or sold. For example, depending on the initial wastewater source, the concentrated brine may include gypsum or inorganic nutrients (e.g. fertilizer). In some implementations, the concentrated brine may be isolated in the evaporation container during transport, temporary storage, and final disposal of the concentrated brine.

A heat source is thermally coupled to the evaporation container. The heat source may be configured to heat the wastewater stream to produce a gas stream including at least water vapor and volatiles. In particular, the temperature and pressure of the evaporation container can be sufficient to cause at least some of the wastewater stream to convert to water vapor and volatiles. The temperature of the evaporation container can be greater than room temperature, and/or the pressure in the evaporation container can be less than atmospheric pressure. In some implementations, a temperature of the evaporation container can be equal to or greater than the boiling point of water. In some implementations, the volatiles of the wastewater stream include one or more hydrocarbons. The wastewater stream that is not converted to water vapor and volatiles may be retained in the concentrated brine. The wastewater stream may be received as a diluted brine prior to the evaporation operation, and may subsequently convert to a concentrated brine after the evaporation operation. The concentrated brine may be retained in the evaporation container as residual solids of various salts and other compounds.

In a thermally coupled process described below, the heat source may include a regenerative heat exchanger. The regenerative heat exchanger can be thermally coupled to both the evaporation container and a condenser module. In a thermally decoupled process, the heat source may include any external heat source such as an external heat source fueled by combustion or electricity. In some implementations, the heat source may be a combination of both an external heat source and a regenerative heat exchanger.

In some implementations, the process 100 may further include flowing a carrier gas from the evaporation module to the water separation module (e.g., membrane module). Mass transport of the gas stream to the water separation module may be achieved using forced convection using the flow of carrier gas. The carrier gas may also be referred to as a sweep gas or purge gas. The carrier gas may circulate between the evaporation container and the water separation module in a gas recirculation loop. In some implementations, the carrier gas may include air, such as room air delivered by a fan, blower, or compressor. For example, the carrier gas may include one or more of nitrogen ($N_2$), carbon dioxide ($CO_2$), oxygen ($O_2$), hydrogen ($H_2$), and inert gas.

At block 115 of the process 100, the water vapor is selectively separated from the volatiles at the water separation module. The water separation module can include a highly water selective barrier, such as an ionomer membrane or ionic liquid. In some implementations, the water separation module can include an ionomer membrane so that the water vapor is selectively permeated through the ionomer membrane of the water separation module. In some implementations, the water separation module can include an ionic liquid for selectively extracting water from a mixture. It will be understood that while the water separation module may utilize an ionomer membrane or ionic fluid for selectively separating the water vapor, other techniques known in the art for selectively separating water vapor may be utilized.

The water separation module is spatially separated from and fluidly coupled to the evaporation container via gas or vapor transport. In other words, the water separation module and the evaporation container may occupy a separate space in a system or apparatus, and may be connected to each other in a manner to permit mass transport of fluid in the gas or vapor phase. In some implementations, the water separation module and the evaporation container may be separable or detachable components of a system or apparatus.

The water vapor and the volatiles may flow to the water separation module after the evaporation operation of block 110. In some implementations utilizing an ionomer membrane, the ionomer membrane may be configured to substantially exclude the volatiles from passing through the ionomer membrane, where the ionomer membrane may reject a substantial percentage of certain volatiles from passing through. As used herein, "substantially" in the context of rejecting such volatiles may refer to rejection of at least 75% of the volatiles in the water separation module, at least 80% of the volatiles in the water separation module, at least 85% of the volatiles in the water separation module, at least 90% of the volatiles in the water separation module, at least 95% of the volatiles in the water separation module, or at least 98% of the volatiles in the water separation module. By way of an example, a weight percentage of one or more contaminants in the condensed water may be calculated with the ionomer membrane and without the ionomer membrane. As used herein, "substantially" in the context of water vapor permeation may refer to permeation of at least 75% of the water vapor in the water separation module, at least 80% of the water vapor in the water separation module, at least 85% of the water vapor in the water separation module, at least 90% of the water vapor in the water separation module, at least 95% of the water vapor in the water separation module, or at least 98% of the water vapor in the water separation module. The selective permeation of the water vapor can be driven by a water vapor partial pressure differential across the ionomer membrane. In some implementations, the ionomer membrane includes Nafion®.

The water vapor can pass through the ionomer membrane by being driven by a partial pressure differential. The ionomer membrane may have a first surface facing a "dirty" side of the water separation module and a second surface facing a "clean" side of the water separation e module that is opposite the first surface. As used herein, the "dirty" side may refer to a side of the water separation module circulating a first gas stream (i.e., dirty gas stream that originates from the evaporation container) comprising water vapor and various contaminants in the gas phase, and the "clean" side may refer to a side of the water separation module circulating a second gas stream (i.e., clean gas stream that is not in direct liquid contact with the content in the evaporation container) comprising water vapor and substantially fewer contaminants in the gas phase than the first gas stream.

The gas stream generated from the evaporation container may flow to and contact the first surface. Water vapor from the gas stream may permeate across the ionomer membrane to the second surface. For the water vapor to pass from the first surface to the second surface, the water vapor partial pressure at the second surface is less than the water vapor partial pressure at the first surface. In some implementations, the lower partial pressure at the second surface can be generated by having a dry sweep gas or purge gas flowing over the second surface on the "clean" side. In some implementations, the lower partial pressure at the second surface on the "clean" side can be created using other suitable techniques. For example, the evaporation operation (e.g., boiling) at block 110 can create a higher partial pressure at the first surface on the "dirty" side, and a component like a condenser or compressor can create a lower partial pressure at the second surface on the "clean" side. In a thermally coupled system, a compressor (e.g., vapor compression pump) can achieve the lower partial pressure at the second surface. In a thermally decoupled system, a condenser (e.g., forced convection condenser) can achieve the lower partial pressure at the second surface.

In some implementations of the process 100, the volatiles of the wastewater stream (e.g., VOCs) can be rejected by the ionomer membrane. The ionomer membrane separates the water vapor from the volatiles. The volatiles may concentrate as a gas mixture. In some implementations, the concentration of volatiles may be recollected to be burned. In some implementations, the concentration of volatiles may be vented from the system and released into the atmosphere. In some implementations, the volatiles may be recirculated to the evaporation container.

At block 120 of the process 100, the water vapor is condensed to purified water in a condenser module. The condenser module may be spatially separated from and fluidly coupled to the water separation module. For example, the condenser module may be fluidly coupled to the water separation module in the gas or vapor phase. The water vapor may condense in the condenser module under appropriate conditions of temperature and pressure. In some implementations, the condenser module may have a higher total pressure than the evaporation container to facilitate condensation in the condenser module. In some implementations, the condenser module may have a lower temperature than the evaporation container to facilitate condensation in the condenser module.

In some implementations, the process 100 further includes flowing a purge gas or dry sweep gas from the water separation module to the condenser module. The purge gas may flow across the second surface of the ionomer membrane to pick up water vapor molecules to form a humidified gas stream. The purge gas may carry the water vapor to the condenser module for collecting the water vapor and forming purified water. In some implementations, the purge gas may be circulated in a gas recirculation loop between the water separation module and the condenser module.

In some implementations, the process 100 further includes treating the humidified gas stream at a contaminant treatment module between the condenser module and the water separation module. Further treating the humidified gas stream can occur between block 115 and block 120. The contaminant treatment module may be configured to treat the humidified gas stream in the gas phase and further remove any volatiles that permeated across the ionomer membrane in the water separation module. This facilitates further purification of the humidified gas stream prior to condensation at the condenser module.

Condensation of the water vapor can produce purified water that can be used without the need for further processing the recovered water. In some implementations, the percentage of water recovery from the wastewater stream can be greater than or equal to 70%, greater than or equal to 75%, greater than or equal to 80%, greater than or equal to 85%, greater than or equal to 90%, or greater than or equal to 95%, or greater than or equal to 98%. The purity of the recovered water can be analyzed for water quality to meet water quality standards for drinking or for commercial use.

In some implementations, the water vapor can condense in the condenser module with the aid of a condenser or compressor. In a thermally decoupled system, a condenser (e.g., forced convection condenser) can provide for a lower temperature and pressure in the condenser module relative to the evaporation container. In a thermally coupled system, a heat pump or compressor can provide for a pressure and temperature in the condenser module that is greater than a pressure and temperature in the evaporation container. In some implementations, the process 100 further includes increasing a pressure in the condenser module relative to the water separation module using a heat pump or compressor.

In some implementations, when the water vapor condenses, the stored heat can be passed to the evaporation container to continue a thermally closed cycle. For example, a regenerative heat exchanger may recycle at least 40%, at least 50%, at least 60%, or at least 70% of the heat from the condenser module and transfer that heat to the evaporation container. In some implementations, a temperature in the condenser module may be reduced relative to the water separation module using the regenerative heat exchanger. Using the regenerative heat exchanger, the recycled heat can drive the evaporation operation of block 110 to continue the thermally closed cycle. Such a thermodynamic cycle of the process 100 can contribute to forming a thermally coupled system for the recovering purified water and concentrated brine. The concentrated brine may be contained in the evaporation container for disposal, reuse, or sale, and the purified water may be contained in the condenser module for disposal, reuse, drinking, or sale.

Figure 2:
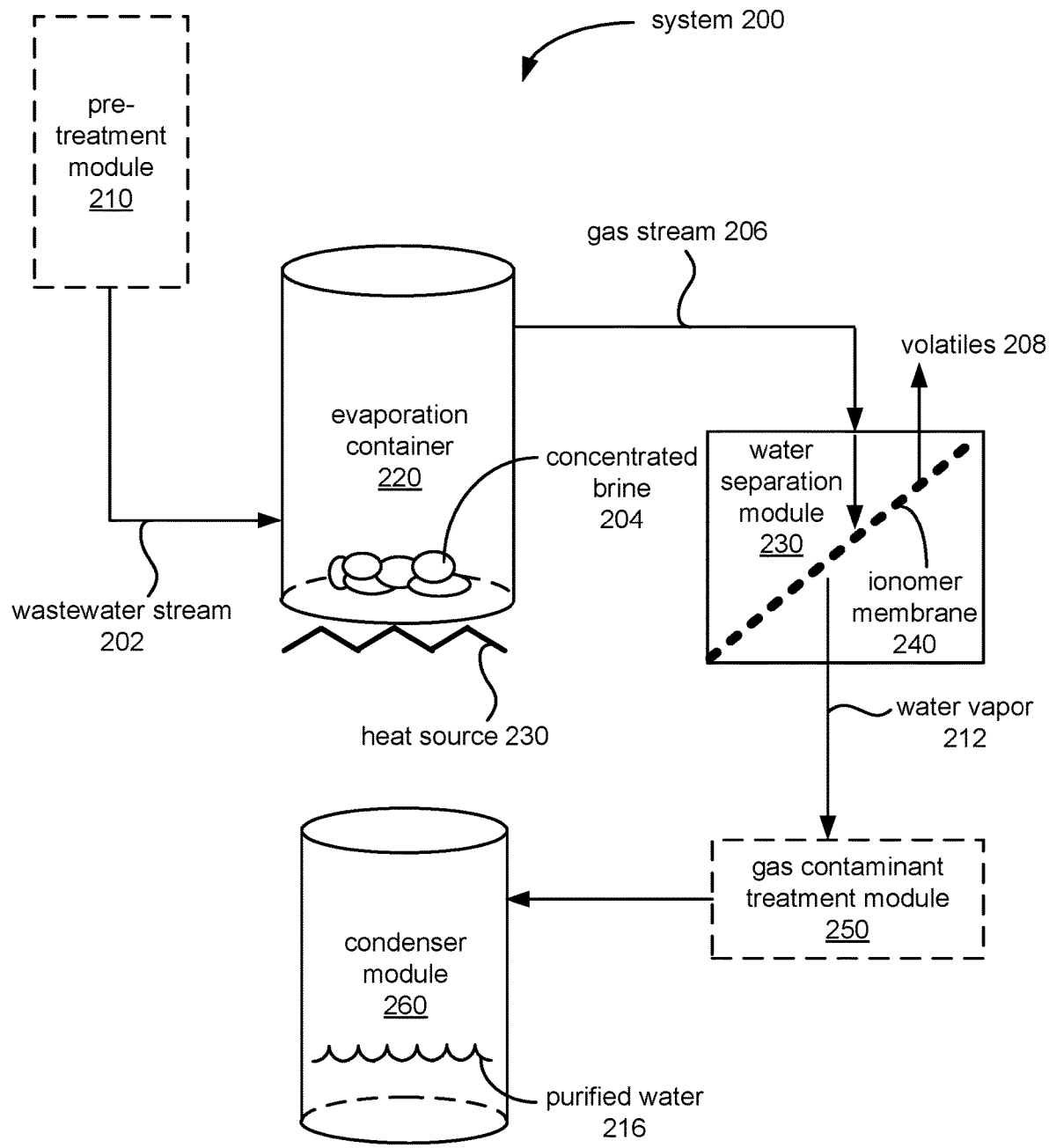
FIG. 2 shows a schematic block diagram of an example system for recovering purified water and concentrated brine from wastewater that may or may not have been pretreated.

FIG. 2 shows a schematic block diagram of an example system for recovering purified water and concentrated brine from wastewater that may or may not have been pretreated. A system 200 may recover purified water from wastewater for subsequent disposal, reuse, drinking, or sale, and the system 200 may separately recover concentrated brine for subsequent disposal, reuse, or sale. The system 200 includes multiple modules that are spatially separated from one another and fluidly coupled to one another for treating wastewater. The system 200 in FIG. 2 allows for separation of wastewater into concentrated brine and purified water under a single process or a single processing system. In other words, concentrated brine and purified water can be produced in a single processing system without requiring additional processing steps. Moreover, the concentrated brine and the purified water can each be self-contained as a result of the single processing system.

A wastewater stream 202 may be introduced into an evaporation container 220. In some implementations, the wastewater stream 202 may be pretreated prior to entering the evaporation container 220. The wastewater stream 202 may be optionally pretreated by a pretreatment module 210. The pretreatment module 210 may serve to stabilize the wastewater stream 202 and/or reduce the levels of contaminants in the wastewater stream 202. It will be understood that while the pretreatment module 210 may perform a biological pretreatment on the wastewater stream 202, alternative forms of pretreatment may be performed by the pretreatment module 210. The wastewater stream 202 can include various contaminants, salts, and VOCs. The wastewater stream 202 may include but is not limited to dissolved organic compounds, nitrogen, ammonium ($NH_4^+$), free ammonia ($NH_3$), nitrate ($NO_3^-$), nitrogen dioxide ($NO_2^-$), chloride ($Cl^-$), sulfate ($SO_4^{2-}$), phosphate ($PO_4^{3-}$), calcium ions ($Ca^{2+}$), magnesium ions ($Mg^{2+}$), sodium ions ($Na^+$), potassium ions ($K^+$), total dissolved solids, and total suspended solids. The treatment module 210 treats the wastewater stream 202 in the liquid phase and may reduce the levels of one or more contaminants in the wastewater stream 202 prior to introduction in the evaporation container 220.

The evaporation container 220 may receive the wastewater stream 202 as influent or input brine stream in the liquid phase. The evaporation container 220 may serve as a tank, vessel, or storage unit for the wastewater stream 202. The evaporation container 220 may be sealed or protected from the ambient environment. The evaporation container 220 may be thermally coupled with a heat source 230. The heat source 230 may be configured to heat the wastewater stream 202 in the evaporation container 220 to cause water and other contaminants to evaporate, thereby producing a gas stream 206 comprising water vapor and volatiles (e.g., VOCs) of the wastewater stream 202. The residual byproduct of the wastewater stream 202 remaining in the evaporation container 220 following evaporation is a concentrated brine 204. The concentrated brine 204 may include residual solids of various salts and other compounds.

The heat source 230 may produce a sufficiently high temperature in the evaporation container 220 to cause evaporation of water and various contaminants into water vapor and volatiles. In some implementations, the heat source 230 may be an external heat source that may be fueled by combustion, electricity, or other suitable means. In some implementations, the heat source 230 may include a regenerative heat exchanger that is configured to cycle heat from a condenser module 260 to the evaporation container 220.

The gas stream 206 flows from the evaporation container 220 to the water separation module 230. The water separation module 230 may be spatially separated from the evaporation container 220 but connected to each other via one or more components. The water separation module 230 may be spatially separated from the evaporation container 220 to separate the wastewater stream 202 in the liquid phase from the gas stream 206 in the gas phase. In other words, water separation module 230 does not contact any of the wastewater stream 202 in the liquid phase. The water separation module 230 is fluidly connected to the evaporation container 220 to solely permit gas and vapor flow to and from evaporation container 220. Mass transport of the gas stream 206 to the water separation module 230 may occur via forced convection and/or pressure differential.

The water separation module 230 may be configured to separate water vapor from volatiles in the gas stream 206. In some implementations, the water separation module 230 includes an ionic liquid for selectively extracting water vapor 212. In some implementations as shown in FIG. 2, the water separation module 230 may include an ionomer membrane 240 configured to be substantially permeable to water vapor 212 but substantially impermeable to one or more volatiles 208. In some implementations, the ionomer membrane 240 can include Nafion®. The ionomer membrane 240 may selectively permeate the water vapor 212 from the gas stream 206 while substantially rejecting the volatiles 208 from the gas stream 206. The rejected volatiles 208 may concentrate together to be recollected, recycled, or vented out of the system 200. A partial pressure differential may drive the water vapor 212 across the ionomer membrane 240 from a "dirty" side of the ionomer membrane 240 to a "clean" side of the ionomer membrane 240.

The ionomer membrane 240 serves as a chemically selective membrane that allows compounds that bind to sulfonic acid groups to readily permeate through the ionomer membrane 240, including water. The ionomer membrane 240 is a chemically-sensitive membrane in that it selectively passes water through the ionomer membrane 240 based on chemical affinity. Rather than selectively removing water or other gases based on molecular size, the ionomer membrane 240 can remove water and other gases based on chemical affinity. For example, the ionomer membrane 240 can remove water and other gases based on their chemical affinity for sulfonic acid groups. In some implementations, the ionomer membrane 240 includes Nafion®.

While Nafion® is an illustrative example of a material for selectively separating water vapor, it will be understood that other materials or fluids may be used in the water separation module 230. Nafion® is a copolymer of tetrafluoroethylene and perfluro-3,6-dioxa-4-methyl-7-octene-sulfonic acid. It is an inert fluorocarbon polymer with ionic channels of sulfonic acid groups scattered throughout. Nafion® is highly resistant to chemical attack, as only alkali metals such as sodium are known to degrade Nafion® under normal temperatures and pressures. In fact, strong acids may be used to regenerate Nafion® if it has been exposed to solutions containing cations. Because of its inertness, Nafion® can be safely disposed in landfills. Nafion® does not burn in ambient air and is more flame-resistant than most other plastics, with a limiting oxygen index of 95%. Nafion® sheets are commercially available through Ion Power, Inc., which is a distributor of Nafion® under E. I. du Pont de Nemours and Company of Wilmington, Del. Different thicknesses of Nafion® are commercially available, which can affect the permeation rates.

Nafion® includes a bulk fluorocarbon matrix with exposed sulfonic acid groups immobilized in the bulk fluorocarbon matrix. Unlike the fluorocarbon matrix, the sulfonic acid groups do not participate in chemical reactions. As a result, the sulfonic acid groups provide several important properties to Nafion®. First, Nafion® functions as an acid catalyst due to the strongly acidic properties of the sulfonic acid group. Second, Nafion® functions as an ion exchange resin when exposed to liquid solutions. Third, Nafion® can readily absorb water, from the vapor phase or the liquid phase. Each of the sulfonic acid groups can absorb up to 13 molecules of water. The sulfonic acid groups can form ionic channels through the fluorocarbon polymer, and water can be easily transported through these channels. Thus, Nafion® can serve as a selective, semi-permeable membrane to water vapor. In some implementations, the ionomer membrane 240 can be provided as a sheet or sheets of Nafion®. In some implementations, the Nafion® of the ionomer membrane 240 can be provided as tubes that can form Nafion® tube walls. Nafion® tubes may be commercially available through Perma Pure LLC of Toms River, N.J.

Nafion® can serve as a selective, semi-permeable membrane to water vapor for water purification because the sulfonic acid groups can pass water while rejecting other compounds, making it possible to separate water from other contaminants or volatiles. The fact that Nafion® acts as an ion exchange resin when exposed to liquids implies that Nafion® is more effective processing gases rather than liquid solutions. When gases and vapors encounter the Nafion®, the Nafion® selectively permeates water vapor while blocking or otherwise "retaining" the volatiles of other compounds. As used herein, "retaining" means that the volatiles of the compounds do not pass through the ionomer membrane 240. The retained volatiles can include various hydrocarbons, such as alkanes, alkenes, alkynes, double and triple-bonded organic compounds, and benzene, among others. Some of the volatiles may be retained by converting into another compound, where some compounds may be susceptible to acid catalysis, for example.

A geometric configuration of the ionomer membrane 240 may optimize membrane surface area in contact with the gas stream 206 to provide increased water production. An optimized membrane surface area may depend on a variety of factors, such as gas flow rates, membrane thickness, desired flux, desired water processing rate, size limitations, weight limitations, etc. In some implementations, the membrane surface area may be at least $0.8 \text{ m}^2$, at least $1 \text{ m}^2$, at least $3 \text{ m}^2$, at least $5 \text{ m}^2$, at least $8 \text{ m}^2$, at least $10 \text{ m}^2$, or between $100 \text{ m}^2$ and $2000 \text{ m}^2$. Increased surface area in the water separation module 230 may provide an increased flux, increased lifetime, and increased water processing rate for permeated water vapor 212. In some implementations, the ionomer membrane 240 may be a tube-and-shell geometry, where the ionomer membrane 240 includes a plurality of tubes. In some implementations, the ionomer membrane 240 may be a spiral-wound geometry. In some implementations, the ionomer membrane 240 may be of a stacked flat-sheet geometry.

Permeated water vapor 212 may flow from the water separation module 230 towards a condenser module 260. A purge gas or dry sweep gas may circulate through the "clean" side of the water separation module 230 to carry the water vapor 212 towards the condenser module 260. The water vapor 212 may condense at the condenser module 260 to collect purified water at the condenser module 260. In some implementations, the condenser module 260 may be spatially separated from and fluidly coupled to the water separation module 230.

In some implementations, water vapor 212 and residual contaminants or volatiles may permeate across the ionomer membrane 240. Such residual contaminants or volatiles may be further treated at a gas contaminant treatment module 250. Examples include but are not limited to activated carbon, ultraviolet (UV) photocatalytic oxidation and UV photolytic oxidation. The gas contaminant treatment module 250 may be configured to further remove inorganic and organic volatiles and/or residual contaminants from a gas stream flowing from the "clean" side of the water separation module 230. For example, various VOCs may still permeate across the ionomer membrane 240 and at least some of the VOCs may be removed from the gas stream prior to entering the condenser module 260.

The condenser module 260 may include a water tank or purified water tank for collection of purified water 216 from condensation of the water vapor 212. The condenser module 260 may include a condenser for condensing the water vapor 212 into the purified water 216. In some implementations, the condenser module 260 is thermally coupled with or integrated with a condensing heat exchanger or regenerative heat exchanger. A regenerative heat exchanger may cycle heat generated from the condenser module 260 back to the evaporation container 220. When the water vapor 212 condenses and forms the purified water 216, the purified water 216 can be stored in the condenser module 260 to be subsequently transferred for local use or drinking. An amount of purified water 216 collected in the condenser module 260 may be equal to or greater than 70%, equal to or greater than 75%, equal to or greater than 80%, equal to or greater than 85%, equal to or greater than 90%, equal to or greater than 95%, or equal to or greater than 98% of the water in the wastewater stream 202.

Figure 3A:
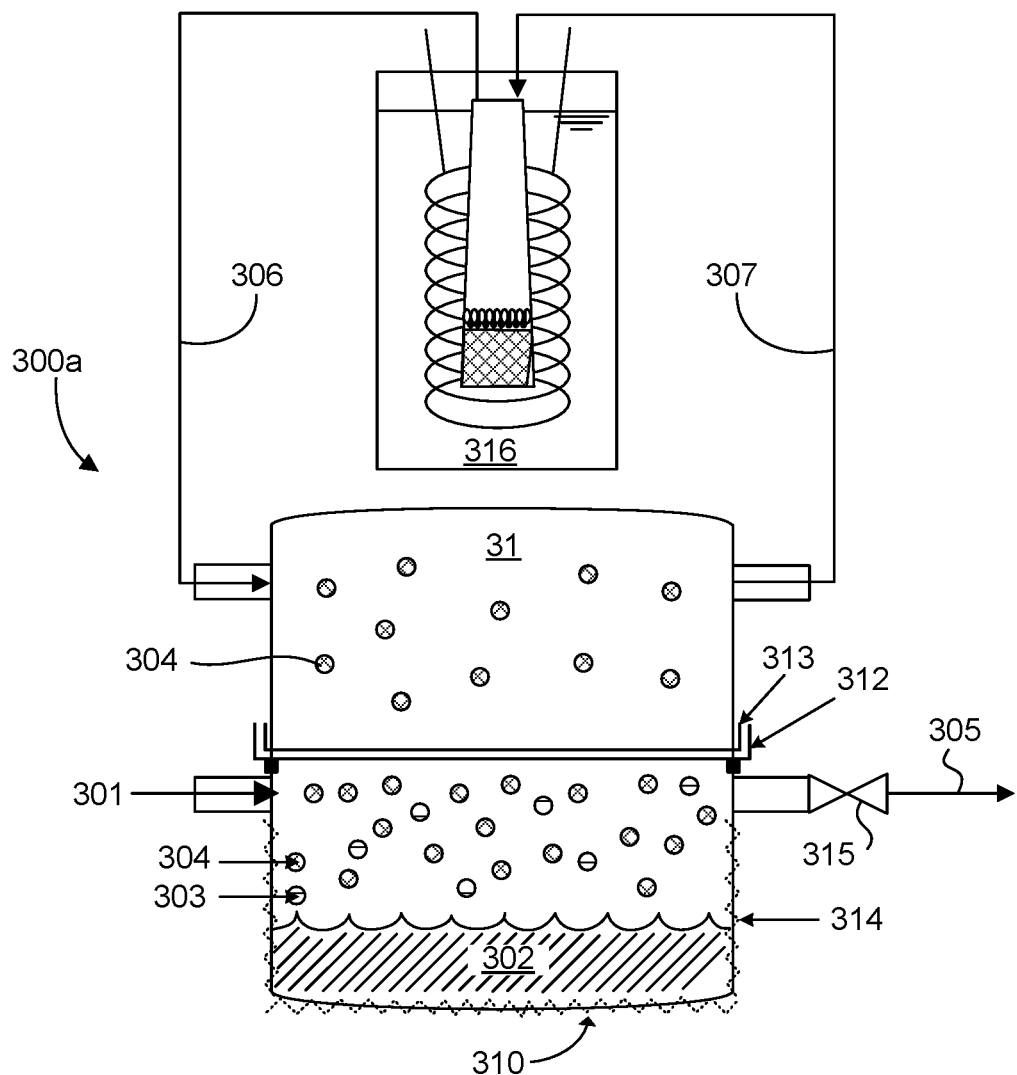
FIG. 3A shows a schematic diagram of an example system for recovering purified water and concentrated brine from wastewater using membranes that are spatially separated from the liquid wastewater and fluidically coupled via gas or vapor transport according to some implementations.
Figure 3B:
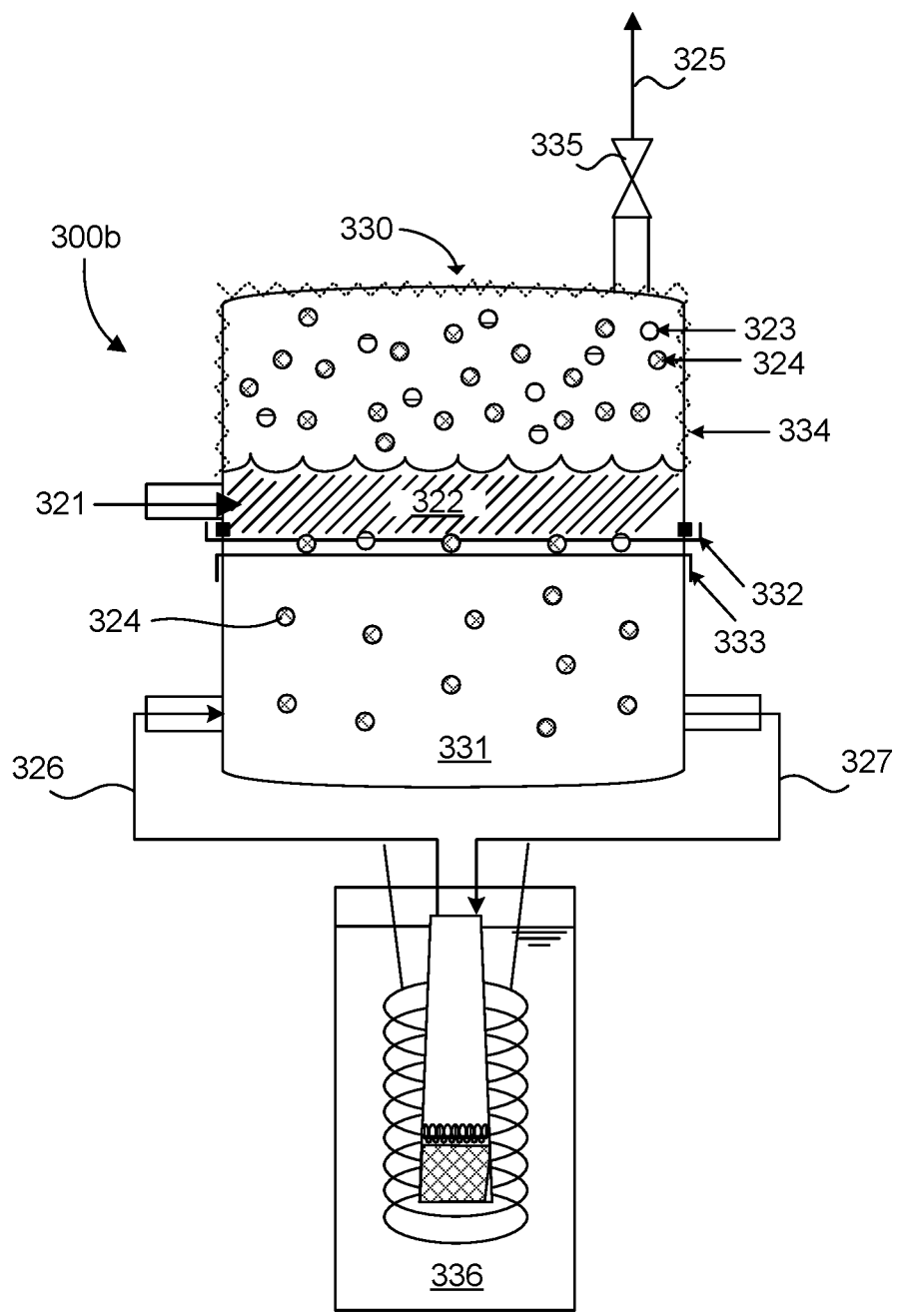
FIG. 3B shows a schematic diagram of an example system for recovering purified water and concentrated brine from wastewater using membranes that are not spatially separated from the wastewater and at least one of the membranes is in contact with the wastewater according to some implementations.
Figure 3C:
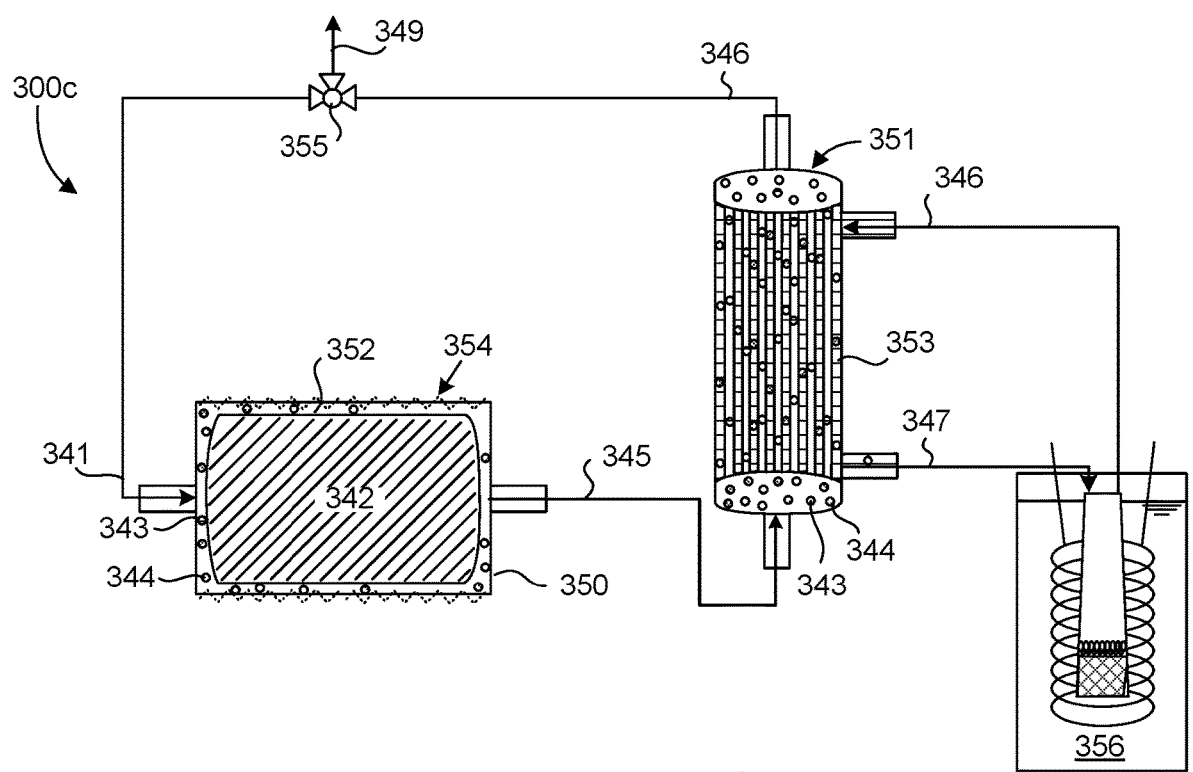
FIG. 3C shows a schematic diagram of an example system for recovering purified water and concentrated brine from wastewater using membranes that allow at least one membrane to contact the liquid wastewater but others that are spatially separated and fluidically coupled via gas or vapor transport according to some implementations.
Figure 3D:
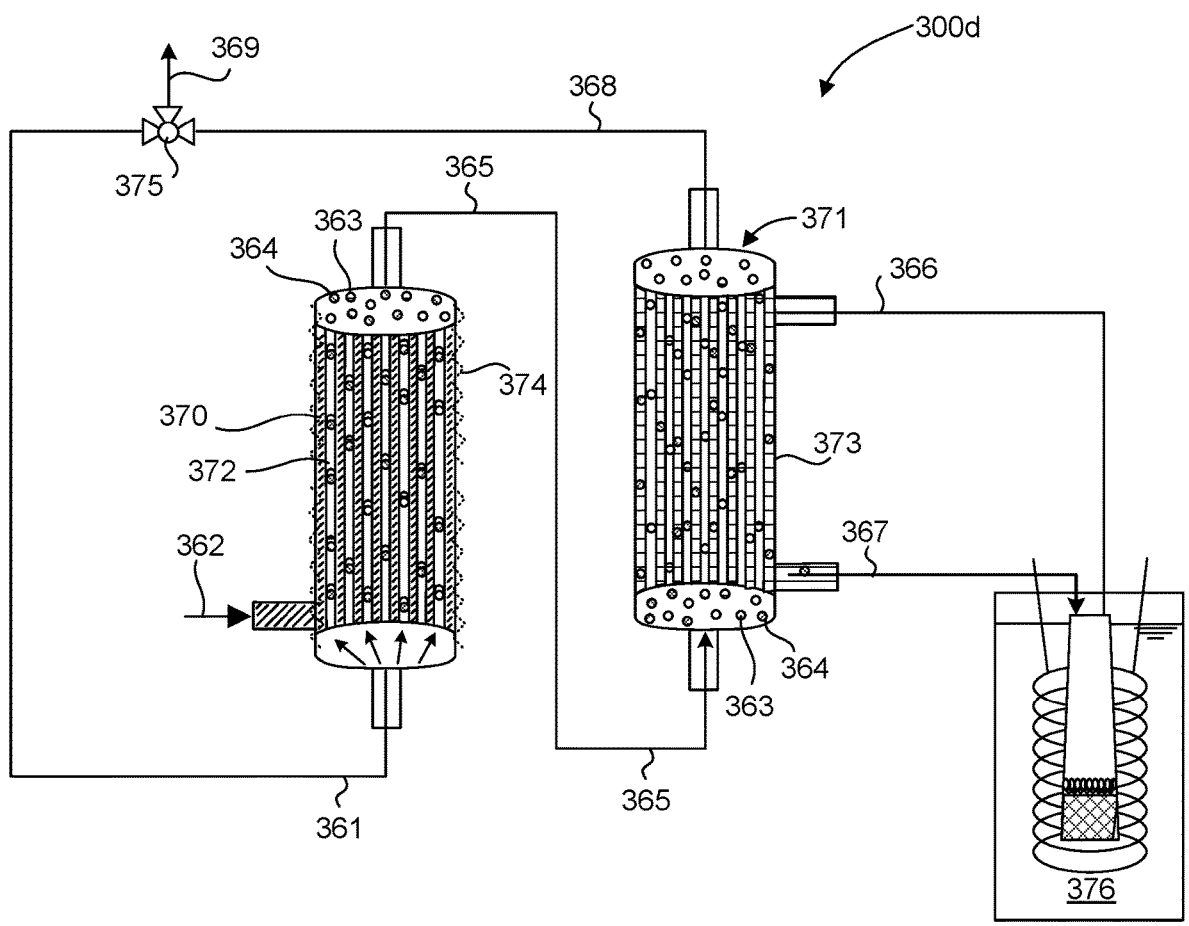
FIG. 3D shows a schematic diagram of an example system for recovering purified water and concentrated brine from wastewater using a hydrophobic microporous membrane that is in contact with liquid wastewater and fluidly coupled to an ionomer membrane via gas or vapor transport according to some implementations.

FIGS. 3A-3D illustrate four different schematic diagrams of example systems for recovering purified water and concentrated brine from wastewater. The example systems in FIGS. 3A-3D illustrate different configurations for separating the treatment of a contaminated stream in the liquid phase and treatment of a contaminated gas stream in the gas phase. In FIGS. 3A, 3C, and 3D, an evaporation module is spatially separated and fluidly coupled to a membrane module, an ionomer membrane being protected from any direct liquid contact with the wastewater. In FIG. 3B, at least one of the membranes is in direct contact with the liquid wastewater but the ionomer membrane is not.

FIG. 3A shows a schematic diagram of an example system for recovering purified water and concentrated brine from wastewater using membranes that are spatially separated from the liquid wastewater and fluidically coupled via gas or vapor transport according to some implementations. A system 300a is an integrated water recovery system for recovering usable water from wastewater. The system 300a includes an evaporation module 310 and a membrane module 311 over the evaporation module 310, where a paired hydrophobic microporous membrane sheet 312 and ionomer membrane sheet 313 separates the evaporation module 310 from the membrane module 311. In some implementations, one or both of the evaporation module 310 and the membrane module 311 may be detachable. The system 300a may be implemented as a gravity-based application, allowing the density of the liquid wastewater 302 to separate the bulk liquid from the ionomer membrane sheet 313.

Liquid wastewater 302 may enter through an inlet 301 of the evaporation module 310. A heater 314 thermally coupled to the evaporation module 310 may boil off or evaporate the liquid wastewater 302 to form gaseous volatiles 303 and water vapor 304. The hydrophobic microporous membrane sheet 312 may ensure no liquid contact with the ionomer membrane sheet 313. In some implementations, the hydrophobic microporous membrane sheet 312 includes expanded polytetrafluoroethylene (ePTFE). The ionomer membrane sheet 313 may selectively transfer the water vapor 304 to the membrane module 311 while retaining the gaseous volatiles 303. Retained gaseous volatiles 303 may be vented out of the system 300a through outlet 305 and controlled by a purge valve 315. A dry purge gas 306 may flow through the membrane module 311. The dry purge gas 306 may pick up the transferred water vapor 304 to form a humidified gas stream 307. The humidified gas stream 307 may flow to a condenser 316 to collect purified water from the humidified gas stream 307.

FIG. 3B shows a schematic diagram of an example system for recovering purified water and concentrated brine from wastewater using membranes that are not spatially separated from the wastewater and at least one of the membranes is in contact with the wastewater according to some other implementations. A system 300b is an integrated water recovery system for recovering usable water from wastewater. Unlike system 300a in FIG. 3A, the system 300b has a hydrophobic microporous membrane sheet 332 directly in contact with liquid wastewater 322.

The system 300b includes an evaporation module 330 and a membrane module 331 underlying the evaporation module 330, where a paired hydrophobic microporous membrane sheet 332 and ionomer membrane sheet 333 separates the evaporation module 330 from the membrane module 331. In some implementations, one or both of the evaporation module 330 and the membrane module 331 may be detachable. The system 300b may be implemented as a gravity-based application, with the weight of the liquid wastewater 322 being supported by the paired membrane sheets 332, 333 and any other structures that comprise the evaporation module 330.

Liquid wastewater 322 may enter through an inlet 321 of the evaporation module 330. A heater 334 thermally coupled to the evaporation module 330 may boil off or evaporate the liquid wastewater 322 to form gaseous volatiles 323 and water vapor 324. The hydrophobic microporous membrane sheet 332 may ensure no liquid contact with the ionomer membrane sheet 333. In some implementations, the hydrophobic microporous membrane sheet 332 includes ePTFE. The ionomer membrane sheet 333 may selectively transfer the water vapor 324 to the membrane module 331 while retaining the gaseous volatiles 323. Retained gaseous volatiles 323 may be vented out of the system 300b through outlet 325 and controlled by a purge valve 335. A dry purge gas 326 may flow through the membrane module 331. The dry purge gas 326 may pick up the transferred water vapor 324 to form a humidified gas stream 327. The humidified gas stream 327 may flow to a condenser 336 to collect purified water from the humidified gas stream 327.

FIG. 3C shows a schematic diagram of an example system for recovering purified water and concentrated brine from wastewater using a water vapor-permeable bladder reservoir fluidly coupled to an ionomer membrane module according to some implementations. A system 300c is an integrated water recovery system for recovering usable water from wastewater. Unlike system 300a in FIG. 3A and system 300b in FIG. 3B, the system 300c performs the evaporation process and selective permeation process in more spatially separate regions.

The system 300c includes an evaporation module 350 and a membrane module 351 spatially separated from the evaporation module 350 but fluidly coupled via gas and vapor phases only to the evaporation module 350. In some implementations, the evaporation module 350 may include a tank, vessel, bladder, or reservoir 352 for holding liquid wastewater 342, where the reservoir 352 includes a water vapor-permeable hydrophobic microporous membrane such as ePTFE. The membrane module 351 may include an ionomer membrane formed as a plurality of tubes 353. Having the hydrophobic microporous membrane configured as a bladder or reservoir and having the ionomer membrane configured as a plurality of tubes may increase the surface area for contact in the gas phase, which can increase flux, lifetime, and water processing rate in water recovery. Having the hydrophobic microporous membrane configured as a bladder may allow for simplified containment, removal, transport, storage, and disposal of the concentrated brine.

Liquid wastewater 342 may be held in the bladder or reservoir 352. A heater 354 thermally coupled to the evaporation module 350 may boil off or evaporate the liquid wastewater 342 to form gaseous volatiles 343 and water vapor 344. The gaseous volatiles 343 and the water vapor 344 may pass through the hydrophobic microporous membrane of the reservoir 352. A dry carrier gas 341 may flow through the evaporation module 350 and pick up the gaseous volatiles 343 and the water vapor 344 to form a humidified contaminated gas stream 345. The dry carrier gas 341 provides mass transport of the humidified contaminated gas stream 345 to the membrane module 351. The membrane module 351 includes a plurality of tubes 353 with the ionomer membrane in a tube-and-shell geometry. The humidified contaminated gas stream 345 may flow through a shell side of the tubes 353 in the membrane module 351. Water vapor 344 may permeate through the ionomer membrane of the tubes 353. Dry purge gas 346 may flow through the lumen side of the tubes 353 to pick up the water vapor 344 and form a humidified clean gas stream 347. The humidified clean gas stream 347 may flow to a condenser 356 to collect purified water from the humidified clean gas stream 347. Retained gaseous volatiles 343 from the humidified contaminated gas stream 345 may be vented out of the system 300c through outlet 349 and controlled by a purge valve 355.

FIG. 3D shows a schematic diagram of an example system for recovering purified water and concentrated brine from wastewater using a hydrophobic microporous membrane that is in contact with liquid wastewater and fluidly coupled to an ionomer membrane via gas or vapor transport according to some implementations. A system 300d is an integrated water recovery system for recovering usable water from wastewater. Unlike system 300a in FIG. 3A and system 300b in FIG. 3B, the system 300d performs the evaporation process and selective permeation process in more spatially separate regions.

The system 300d includes an evaporation module 370 and a membrane module 371 spatially separated from the evaporation module 370 but fluidly coupled to the evaporation module 370. The evaporation module 370 may include a plurality of hydrophobic microporous membrane tubes 372 in a tube-and-shell geometry. In some implementations, the hydrophobic microporous membrane tubes 372 may include ePTFE. The membrane module 371 may include a plurality of ionomer membrane tubes 373 in a tube-and-shell geometry. The tube-and-shell geometry in both modules 370, 372 may increase the surface area for contact in the gas phase, which can increase flux, lifetime, and water processing rate in water recovery.

Liquid wastewater 362 may enter the evaporation module 370 through a shell side of the hydrophobic microporous membrane tubes 372. A heater 374 thermally coupled to the evaporation module 370 may boil off or evaporate the liquid wastewater 362 to form gaseous volatiles 363 and water vapor 364. The gaseous volatiles 363 and the water vapor 364 may pass through the hydrophobic microporous membrane tubes 372 on the shell side and into the lumens of the hydrophobic microporous membrane tubes 372. A dry carrier gas 361 may flow through the lumens of the hydrophobic microporous membrane tubes 372 and pick up the gaseous volatiles 363 and the water vapor 364 to form a humidified contaminated gas stream 365. The dry carrier gas 361 provides mass transport of the humidified contaminated gas stream 365 to the membrane module 371. The humidified contaminated gas stream 365 may flow through the shell or lumen side of the ionomer membrane tubes 373 in the membrane module 371. Water vapor 364 may permeate through the ionomer membrane tubes 373. Dry purge gas 366 may flow through the opposite side (relative to the contaminated gas stream 365) of the ionomer membrane tubes 373 to pick up the water vapor 364 and form a humidified clean gas stream 367. The humidified clean gas stream 367 may flow to a condenser 376 to collect purified water from the humidified clean gas stream 367. Retained gaseous volatiles 363 from the humidified contaminated gas stream 365 may be vented out of the system 300d through outlet 369 and controlled by a purge valve 375.

Figure 4:
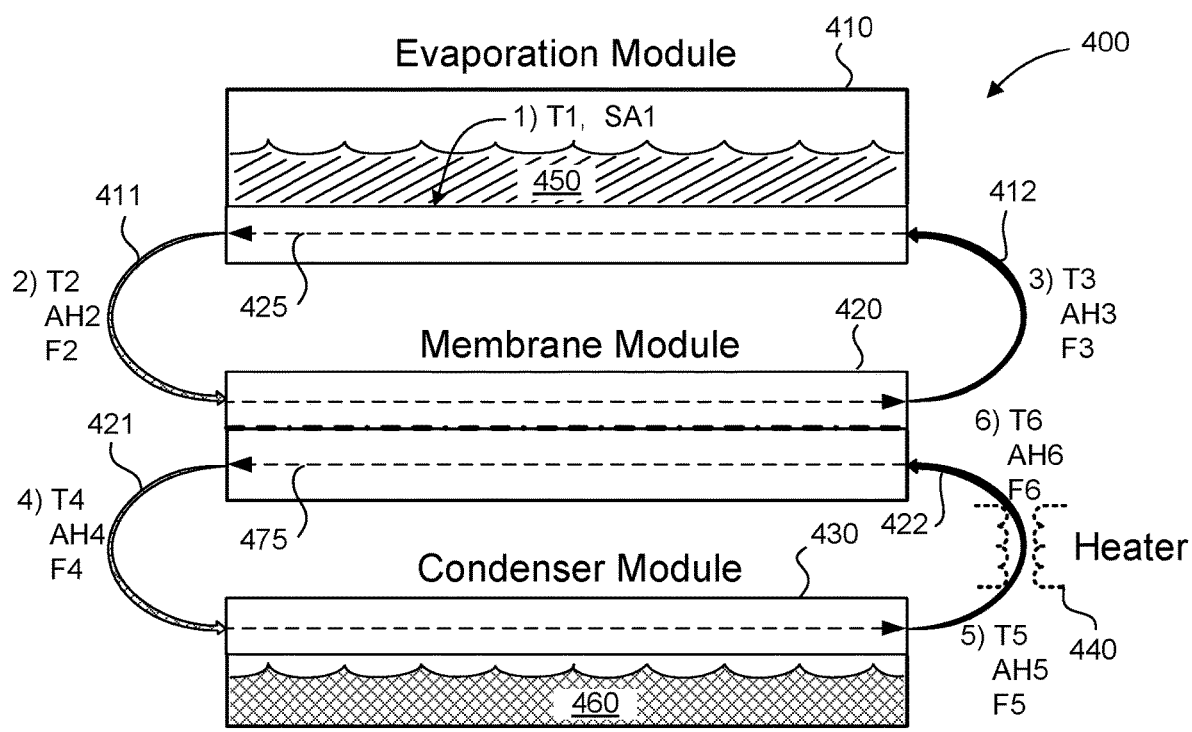
FIG. 4 shows a schematic block diagram of an example system for recovering purified water and concentrated brine from wastewater using membranes including at least two gas circulation loops.

FIG. 4 shows a schematic block diagram of an example system for recovering purified water and concentrated brine from wastewater using membranes including at least two gas circulation loops. A system 400 includes an evaporation module 410, a membrane module 420, and a condenser module 430, each of the modules 410, 420, 430 spatially separated from one another. A first gas recirculation loop 425 may flow dry purge gas between the evaporation module 410 and the membrane module 420. When liquid wastewater 450 is evaporated to form a first contaminated gas stream 411, the first contaminated gas stream 411 flows across the membrane module 420 by forced convection. The membrane module 420 selectively permeates water vapor and substantially rejects volatiles from the first contaminated gas stream 411 to form a second contaminated gas stream 412 that may be vented out of the system 400 or returned to the evaporation module 410.

A second gas recirculation loop 475 may flow dry purge gas between the membrane module 420 and the condenser module 430. When water vapor is permeated through the membrane module 420, the dry purge gas picks up water vapor to form a first humidified gas stream 421. The first humidified gas stream 421 may flow to the condenser module 430 by forced convection and condense the water vapor to purified water 460. Remaining uncondensed gases and purge gas may flow out of condenser module 460 and circulate back to the membrane module 420. In some implementations, latent heat released from the condensation may cycle back the evaporation module 410. In some implementations, a heater 440 may provide heat to the evaporation module 410.

Figure 5:
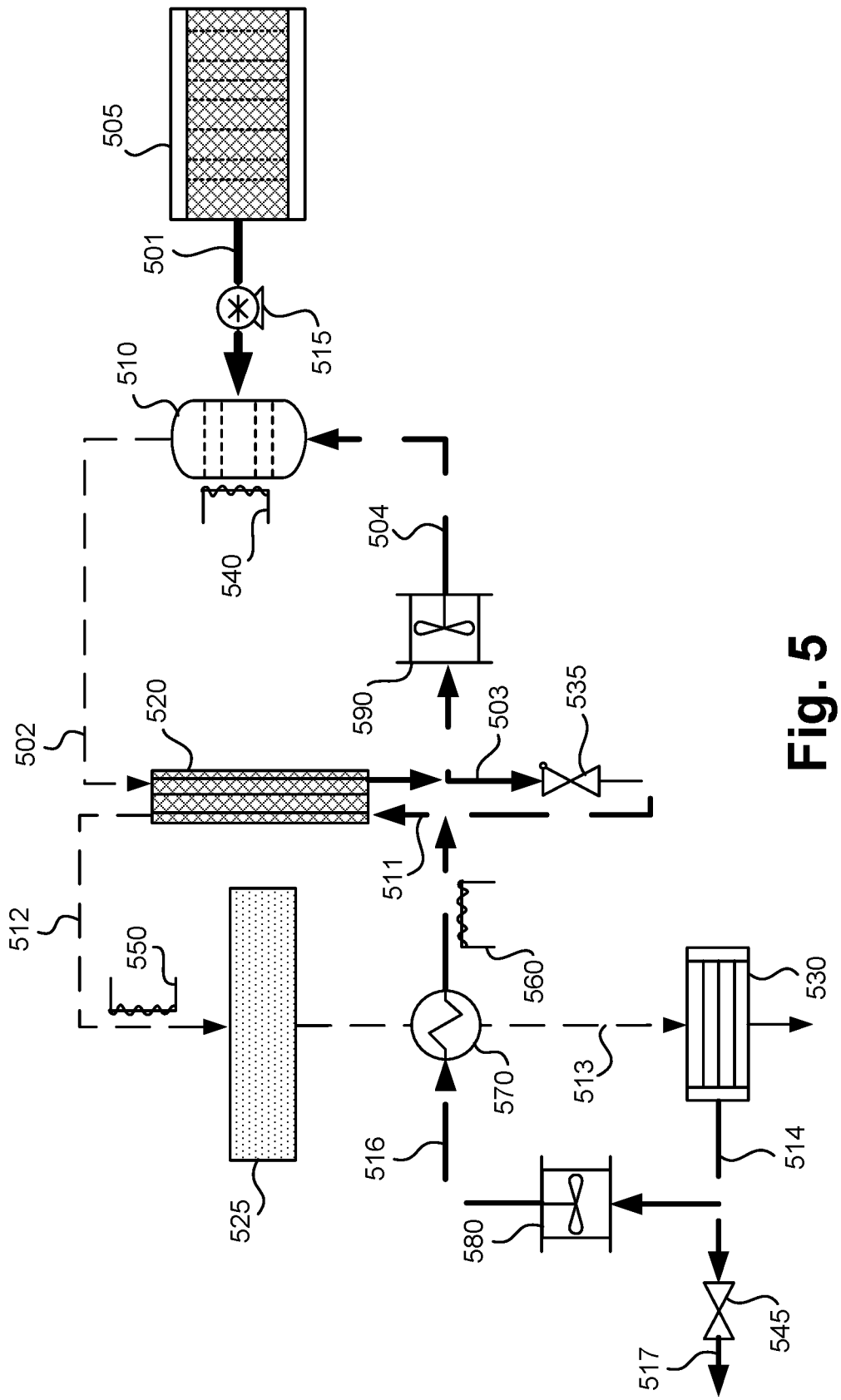
FIG. 5 shows a schematic system diagram of an example system for recovering purified water and concentrated brine from wastewater incorporating additional features such as thermal energy introduction and removal to drive a water transport process, forced convection to transport water vapor, energy recovery devices such as heat exchangers to reduce energy use, and a tertiary water treatment process to further purify the product water.

FIG. 5 shows a schematic system diagram of an example system for recovering purified water and concentrated brine from wastewater incorporating additional features such as thermal energy introduction and removal to drive a water transport process, forced convection to transport water vapor, energy recovery devices such as heat exchangers to reduce energy use, and a tertiary water treatment process to further purify the product water. In a system 500, stabilized wastewater 501 may be received from a pretreatment module 505 via a metering pump 515. The stabilized wastewater 501 enters an evaporation container 510 for holding the stabilized wastewater 501 and retaining residual solids after an evaporation operation. A heater 540 is thermally coupled to the evaporation container 510 to impart energy to the stabilized wastewater 501 perform an evaporation operation to form water vapor and volatiles (e.g., VOCs). In addition or in the alternative, one or more heaters 550, 560 may be positioned elsewhere in the system 500 to prevent condensation except at the condenser module 530. A fan or blower 590 may provide dry carrier gas to the evaporation container 510 and carry the water vapor and volatiles in a humidified contaminant gas stream 502 towards a water separation module 520. The humidified contaminant gas stream 502 enters the water separation module 520 by forced convection on a "dirty" side of the water separation module 520. The water separation module 520 may provide a semi-permeable membrane or ionic fluid that selectively permeates water vapor to a "clean" side of the water separation module 520 while substantially rejecting volatiles to the "dirty" side of the water separation module 520. The rejected volatiles in a de-humidified contaminant gas stream 503 may be vented to atmosphere or recirculated back to the evaporation container 510 at a check valve 535.

A fan or blower 580 may provide dry purge gas to the water separation module 520 at the "clean" side. The dry purge gas may carry permeated water vapor and any residual volatiles on the "clean" side in a humidified clean gas stream 512 towards a gas contaminant treatment module 525. Because some organics, acids, and other contaminant gases may permeate through the water separation module 520 to the "clean" side, the gas contaminant treatment module 525 may further treat and purify the humidified clean gas stream 512 to remove one or more such organics, acids, and contaminant gases. A humidified cleaner gas stream 513 is provided after treatment at the gas contaminant treatment module 525. The humidified cleaner gas stream 513 is flowed to a condenser module 530 with a condensing heat exchanger, where the condenser module 530 condenses water vapor in the humidified cleaner gas stream 513 to purified water. Latent heat released by the condensation reaction may be cycled back to the evaporation container 510 by a regenerative heat exchanger 570. After condensation, a de-humidified cleaner gas stream 514 may recirculate back to the "clean" side of the water separation module 520 or vented back to atmosphere at check valve 545. Along a gas recirculation loop flowing between the water separation module 520 at the "clean" side and the condenser module 530, one or more heaters 550, 560 may be positioned to ensure that condensation does not take place except at the condenser module 530. Thus, a heater 550, 560, and/or 570 may be placed to heat up the wastewater 501 at the evaporation container 510, with the humidified clean gas stream 512 on the "clean" side, or with a contaminated flow 516 returning to the evaporation container 510.

Figure 6:
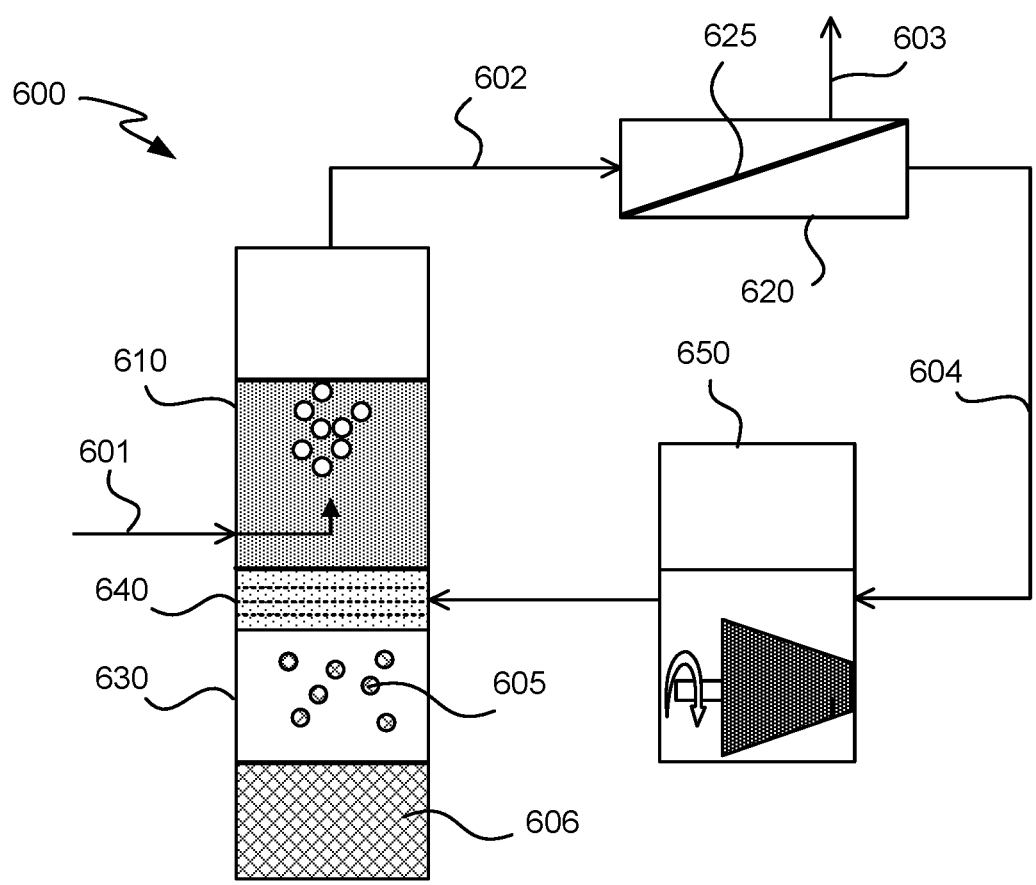
FIG. 6 shows a schematic block diagram of an example system for recovering purified water and concentrated brine from wastewater using differentials in partial pressure.

FIG. 6 shows a schematic block diagram of an example system for recovering purified water and concentrated brine from wastewater using differentials in partial pressure. The system 600 in FIG. 6 shows a thermally coupled system for recovering purified water and concentrated brine, though it will be understood that the system 600 in FIG. 6 may operate to recover purified water and concentrated brine in a thermally decoupled system. The system 600 in FIG. 6 may illustrate a thermodynamic loop for energy savings and may operate with fewer gas recirculation loops.

The system 600 includes a first containment unit 610 configured to receive wastewater 601, a water separation module 620 fluidly coupled to the first containment unit 610, and a second containment unit 630 fluidly coupled to the water separation module 620. The first containment unit 610 may also be referred to as an "evaporation container" or "sealed wastewater tank," and the second containment unit 630 may also be referred to as a "condenser module" or "purified water tank." In some implementations, the water separation module 620 may also be referred to as a "membrane module."

The wastewater 601 in FIG. 6 may include various contaminants, salts, and VOCs. The system 600 may include a heat source thermally coupled to the first containment unit 610, where the heat source is configured to heat the wastewater 601 to produce water vapor and volatiles (e.g., VOCs) of the wastewater 601. A gas stream 602 carrying the water vapor and volatiles may be transferred to the water separation module 620, such as by forced convection or a partial pressure differential. At least some of the heat for evaporating the wastewater 601 may be provided by a regenerative heat exchanger 640 in the system 600. It will be understood, however, that other external heat sources may be used in addition or in the alternative to the regenerative heat exchanger 640 to heat up the first containment unit 610.

The water separation module 620 may include an ionomer membrane 625, where the ionomer membrane 625 has a first surface configured to receive and contact the gas stream 602 from the first containment unit 610 and a second surface opposite the first surface. A partial pressure differential can be formed between a first surface of the ionomer membrane 625 and a second side of the ionomer membrane 625, where the water vapor partial pressure at the second surface is less than the water vapor partial pressure at the first surface. The ionomer membrane 625 may selectively permeate water vapor from the first surface to the second surface and substantially reject volatiles 603 at the first surface. In some implementations, the rejected volatiles 603 may be vented to atmosphere or transferred to another module or container for further treatment/disposal. It will be understood that the system 600 may not include a gas recirculation loop between the first containment unit 610 and the water separation module 620.

In some implementations, the ionomer membrane 625 includes Nafion®. The ionomer membrane 625 facilitates transfer of water vapor 604 by chemical affinity. The first containment unit 610 provides liquid-gas separation whereas the water separation module 620 provides gas-gas separation.

As shown in FIG. 6, the system 600 can further include a heat pump 650 between the water separation module 620 and the second containment unit 630. In some implementations, the heat pump 650 includes a compressor or is coupled with a compressor. The heat pump 650 may serve one or more functions such as to provide a reduced water vapor partial pressure at the second surface to draw the water vapor 604 across the ionomer membrane 625. In some implementations, the compressor may serve to increase the overall pressure in the second containment unit 630 relative to the first containment unit 610 to allow condensation to occur.

The heat pump 650 may be configured to produce a lower pressure at the second surface of the ionomer membrane 625 relative to the first surface. The first surface of the water separation module 620 and the first containment unit 610 may be above atmospheric pressure. The second surface of the water separation module 620 and the heat pump 650 may be below atmospheric pressure. The pressure differential may drive transport of the water vapor 604 across the ionomer membrane 625 and towards the second containment unit 630.

In a thermally decoupled system, water vapor 605 may condense in the second containment unit 630 at a reduced temperature and pressure relative to the first containment unit 610. For example, a condenser (e.g., forced convection condenser) can achieve this condition, where a condenser can achieve a lower partial pressure at the second surface. In a thermally coupled system 600 as shown in FIG. 6, the water vapor 605 may condense in the second containment unit 630 at an increased temperature and pressure relative to the first containment unit 610. For example, a heat pump 650 with a compressor can achieve this condition, where a compressor (e.g., vapor compression pump) can achieve a lower partial pressure at the second surface. In some implementations, the water vapor 605 may condense with an increased pressure without an increased temperature.

The heat pump 650 may transfer heat from the water separation module 620 to the second containment unit 630. At the second containment unit 630, water vapor 605 condenses and release heat as a result of the condensation, increasing the temperature in the second containment unit 630. A regenerative heat exchanger 650 may transfer heat from the second containment unit 630 to the first containment unit 610. Accordingly, the regenerative heat exchanger 650 may reduce a temperature in the second containment unit 610 relative to the water separation module 620, where the regenerative heat exchanger 650 is configured to cycle heat from the second containment unit 630 to the first containment unit 610. Thus, the regenerative heat exchanger 650 may be thermally coupled to both the first containment unit 610 and the second containment unit 630.

When the water vapor 605 condenses, it forms purified water 606 that can be stored in the second containment unit 630 and subsequently transferred for local use. In addition, concentrated brine left behind during the evaporation operation in the first containment unit 610 can be subsequently transferred for reuse or sold in various industries.

Figure 7:
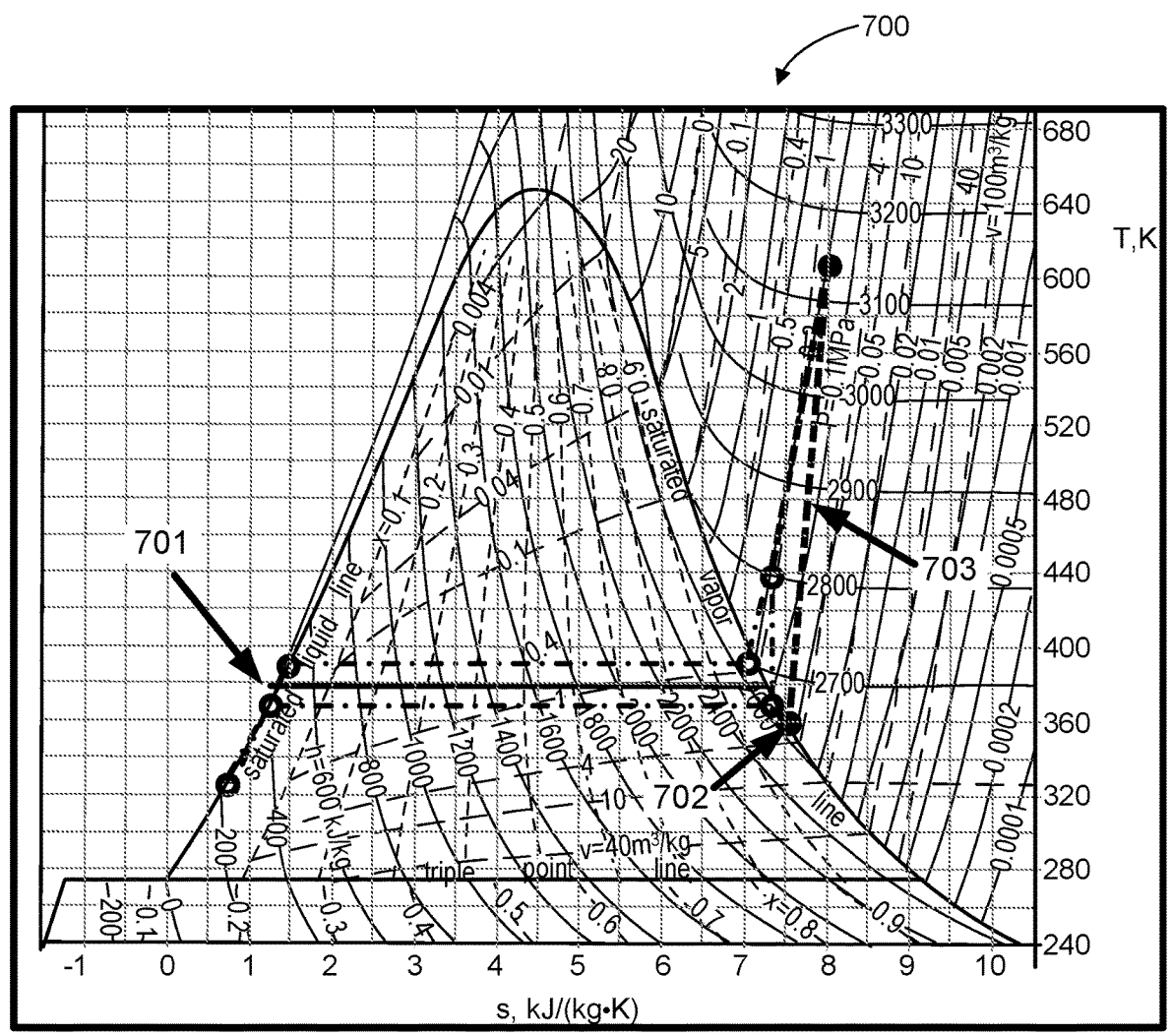
FIG. 7 shows a phase diagram of water and an example process for extracting and collecting purified water using a thermodynamic loop in the phase diagram.

FIG. 7 shows a phase diagram of water and an example process for extracting and collecting purified water using a thermodynamic loop in the phase diagram. When the wastewater stream is initially introduced into the first containment unit, the wastewater stream is in a liquid phase and can be exposed to room temperature and pressure, as indicated at the bottom left of the phase diagram 700 at 701. The wastewater stream is heated in the first containment unit to saturation, and the temperature is shown as increasing in the phase diagram 700. When the wastewater stream reaches a boiling point, the wastewater stream evaporates into water vapor and crosses the dome in the phase diagram 700 to a saturated vapor line on the right side. When the water vapor reaches and contacts the ionomer membrane, the pressure drops at 702. This is due in part to the partial pressure differential between the first side and the second side of the ionomer membrane. A compressor and/or heat pump adds pressure to pressurize the water vapor at 703. The compressor and/or heat pump may increase temperature. Then the water vapor interfaces with the saturated vapor line and crosses the dome along an isothermal surface to condense back to liquid at 701. The phase diagram 700 of FIG. 7 may reflect a thermodynamic cycle for water in the thermally coupled system.

Although the foregoing disclosed systems, methods, apparatuses, processes, and compositions have been described in detail within the context of specific implementations for the purpose of promoting clarity and understanding, it will be apparent to one of ordinary skill in the art that there are many alternative ways of implementing foregoing implementations which are within the spirit and scope of this disclosure. Accordingly, the implementations described herein are to be viewed as illustrative of the disclosed inventive concepts rather than restrictively, and are not to be used as an impermissible basis for unduly limiting the scope of any claims eventually directed to the subject matter of this disclosure.

What is claimed is:

1. A system for treating wastewater, comprising:
   an evaporation container holding wastewater comprising water and a plurality of contaminants;
   a heat source thermally coupled to the evaporation container, wherein the heat source is configured to heat the wastewater to produce a gas stream comprising water vapor and volatiles of the plurality of contaminants;
   a water separation module spatially separated from and fluidly coupled to the evaporation container via gas or vapor transport, wherein the water separation module is configured to receive the water vapor and volatiles of the plurality of contaminants, wherein the volatiles include gaseous hydrocarbons, wherein the water separation module is configured to separate the water vapor from the volatiles, wherein the water separation module includes an ionomer membrane having exposed sulfonic acid groups in a bulk fluorocarbon matrix, wherein the ionomer membrane is permeable to the water vapor but substantially impermeable to the volatiles, wherein the water separation module includes a plurality of tubes with the ionomer membrane in a tube-and-shell geometry;
   a condenser module spatially separated from and fluidly coupled to the water separation module, wherein the condenser module is configured to receive the water vapor and collect purified water;
   a carrier gas source configured to flow carrier gas through the evaporation container to carry the gas stream from the evaporation container to the water separation module and across a shell side of the plurality of tubes;
   a purge gas source configured to flow purge gas through a lumen side of the plurality of tubes to carry the water vapor from the water separation module to the condenser module; and
   a regenerative heat exchanger thermally coupled with the condenser module and the evaporation container, wherein the regenerative heat exchanger is configured to cycle heat from the condenser module to the evaporation container.

2. The system of claim 1, wherein the ionomer membrane has a first surface configured to receive and contact the gas stream from the evaporation container and a second surface opposite the first surface, wherein water vapor partial pressure at the second surface is less than water vapor partial pressure at the first surface.

3. The system of claim 2, further comprising:
   a heat pump between the water separation module and the condenser module, wherein the heat pump is configured to produce a lower pressure at the second surface of the ionomer membrane relative to the first surface, and a greater pressure in the condenser module relative to the water separation module.

4. The system of claim 1, wherein a membrane surface area of the ionomer membrane is between about 100 m$^2$ and about 1000 m$^2$.

5. The system of claim 1, wherein the plurality of contaminants include dissolved organic compounds, nitrogen, ammonium ($NH_4^+$), free ammonia ($NH_3$), nitrate ($NO_3^-$), nitrogen dioxide ($NO_2^-$), chloride ($Cl^-$), sulfate ($SO_4^{2-}$), phosphate ($PO_4^{3-}$), calcium ions ($Ca^{2+}$), magnesium ions ($Mg^{2+}$), sodium ions ($Na^+$), potassium ions ($K^+$).

6. The system of claim 1, wherein the evaporation container is configured to retain concentrated brine from the wastewater and the condenser module is configured to retain purified water from the water vapor.

7. The system of claim 6, wherein the evaporation container is detachable from the system to isolate the concentrated brine from the system when the evaporation container is transported on a transportable vessel.

8. The system of claim 1, further comprising:
   a pretreatment module fluidly coupled to the evaporation container, wherein the pretreatment module is configured to provide stabilized wastewater to the evaporation container.

9. The system of claim 1, further comprising:
   a contaminant treatment module between the water separation module and the condenser module, the contaminant treatment module being spatially separated from and fluidly coupled to each of the water separation module and the condenser module, wherein the contaminant treatment module is configured to further remove volatiles of the wastewater.

10. The system of claim 1, wherein the water separation module includes an outlet configured to vent the volatiles retained by the water separation module out of the system into atmosphere.

11. The system of claim 1, wherein a pressure in the condenser module is greater than a pressure in the water separation module, and wherein a temperature in the condenser module is less than a temperature in evaporation container.

* * * * *